United States Patent
Kunishige et al.

(10) Patent No.: US 7,239,351 B2
(45) Date of Patent: Jul. 3, 2007

(54) SYSTEM MATCHING FINDER VIEW AREA AND CAPTURE AREA IN SINGLE-LENS REFLEX IMAGE PICKUP APPARATUS, METHOD THEREOF, AND IMAGE PICKUP APPARATUS THEREOF

(75) Inventors: Keiji Kunishige, Tokyo (JP); Naoki Fujii, Tokyo (JP)

(73) Assignee: Olympus Corporation, Tokyo (JP)

( * ) Notice: Subject to any disclaimer, the term of this patent is extended or adjusted under 35 U.S.C. 154(b) by 667 days.

(21) Appl. No.: 10/307,897

(22) Filed: Dec. 2, 2002

(65) Prior Publication Data

US 2003/0146999 A1     Aug. 7, 2003

(30) Foreign Application Priority Data

Dec. 10, 2001     (JP)     ............................. 2001-376191

(51) Int. Cl.
H04N 17/00 (2006.01)
H04N 17/02 (2006.01)
H04N 5/222 (2006.01)
H04N 5/225 (2006.01)
G03B 13/14 (2006.01)

(52) U.S. Cl. ............ 348/333.09; 348/187; 348/333.01; 348/341; 396/149; 396/377

(58) Field of Classification Search ................ 348/180, 348/187–191, 207.1, 333.01, 33.09, 341; 396/139–141, 148–149, 373, 377, 380
See application file for complete search history.

(56) References Cited

U.S. PATENT DOCUMENTS 4,929,971 A * 5/1990 Imura et al. ................ 396/311
4,978,983 A * 12/1990 St.ANG.lfors ............... 396/89

FOREIGN PATENT DOCUMENTS

| JP | U-7-005135 | 1/1995 |
| JP | 8-304910 A | 11/1996 |
| JP | A-11-344746 | 12/1999 |
| JP | A-2000-134528 | 5/2000 |

OTHER PUBLICATIONS

Japanese Office Action for 2001-376191, mailed Nov. 28, 2006 (2 pp.).

* cited by examiner

*Primary Examiner*—Ngoc-Yen Vu
*Assistant Examiner*—Daniel Pasiewicz
(74) *Attorney, Agent, or Firm*—Straub and Pokotylo; John C. Pokotylo (57) ABSTRACT

A video camera obtains a capture scope obtained through finder optics of a single-lens reflex camera and indicated by a view frame mask. A PC detects the position corresponding to the capture scope from the captured image captured by the image pickup device of the single-lens reflex camera, generates the information designating the position, and stores the information in the single-lens reflex camera. The system controller of the single-lens reflex camera extracts a part of the area in the captured image captured by the image pickup device, and records the image of the area in a memory card.

16 Claims, 8 Drawing Sheets

SYSTEM MATCHING FINDER VIEW AREA AND CAPTURE AREA IN SINGLE-LENS REFLEX IMAGE PICKUP APPARATUS, METHOD THEREOF, AND IMAGE PICKUP APPARATUS THEREOF

BACKGROUND OF THE INVENTION

1. Field of the Invention

The present invention relates to a technology for use with an image pickup apparatus, and more specifically to a controlling technology for use with an image pickup apparatus in the single-lens reflex system which captures a subject image captured through finder optics by forming the image on the surface of an image pickup device through pickup optics.

2. Description of the Related Art

A digital camera is well known with its configuration of finder optics and pickup optics for capturing a subject image obtained through the finder optics and forming the image on the surface of the image pickup device through the pickup optics. With this type of camera, it is desired that the scope visually identified within the view frame in the finder optics strictly matches the scope of the captured image actually recorded by the camera. A desired view ratio obtained by dividing the scope within a view frame by the scope of a captured image as represented on a percentage basis is 100%.

However, actually in the production process of a digital camera, a delicate alignment error occurs in setting a view frame and an image pickup device. Therefore, to suppress the occurrence of a case in which a part of an image in the view frame cannot be recorded due to the alignment error, a reduced view frame is set with an alignment error taken into account. Therefore, the view ratio obtained by the digital camera using the above mentioned view frame has been about 95% at most.

To improve the view ratio, there is a method of minutely controlling the alignment between the view frame and the image pickup device in the production process of a digital camera. However, in this method, the production cost soars by the alignment control. Furthermore, for example, if a CCD (charge coupled device) is used, then a precision error (±0.15 mm approximately) occurs in the fixed position of the CCD in its parts package, and the similar precision error occurs in the outer shape of the parts package, thereby making it more difficult to specify a reference position for alignment control, and presenting the most difficult controlling operation.

Relating to the technology of reducing the displacement between the scope visually identified within the view frame set by the finder optics and the scope of a captured image actually recorded by the pickup optics, Japanese Patent Publication No.8-304910 discloses the invention of computing the amount of displacement of a view based on the measurement result of a distance to a subject and providing an area segmented from a capture area based on the computation result as a printing screen, thereby substantially matching the view area with the area displayed on the printing screen so that the displacement occurring between the view area and the capture area obtained by different optics, and changing in amount depending on the distance to a subject, which is referred to as parallax, can be corrected. However, the invention has the problem of the high cost and the heavy devices because it requires exclusive hardware for computing the amount of displacement of a view or a program for computing a general-purpose arithmetic device in the image pickup apparatus. Furthermore, the invention has to compute the amount of displacement if a view each time a capturing process is performed, thereby causing the problems of the response in the capturing process, and the power consumption. Additionally, the parallax also occurs in the camera in which the finder optics and the pickup optics are different optics. This parallax problem does not practically occur in the single-lens reflex system in which the finder optics and the pickup optics share optics with each other.

SUMMARY OF THE INVENTION

To solve the above-mentioned problems, the present invention aims at easily providing high-quality finder optics capable of guaranteeing an ideal view ratio.

To attain the above mentioned purpose, the control method which is one of the aspects of the present invention includes the steps of, with a view to controlling the view area of the finder optics provided in the image pickup apparatus in the single-lens reflex system to be consistent with the record area in which data is captured by the image pickup apparatus in the single-lens reflex system: designating an area displayed by the finder optics as a finder view area; designating the area captured by the image pickup apparatus as a capture area; extracting from the capture area an area which is located relative to the finder view area; designating the position information about the extracted area; and recording the position information about the extracted area in a storage unit of the image pickup apparatus in the single-lens reflex system.

Using the above mentioned method, the image pickup apparatus can be allowed to segment the area indicated by the position information stored in the storage unit from the capture area, and record the image in the segmented area when the image is captured, thereby allowing the area indicated by the recorded image to successfully match the view area of the finder optics provided in the image pickup apparatus. Furthermore, since the position information is stored in the storage unit of the image pickup apparatus, the control method according to the present invention has to be used only once before capturing an image, and it is not necessary to repeat using it each time an image is captured.

To designate the position information about an extracted area in the above mentioned method according to the present invention, the correlation coefficient of a subject image between the capture area in the image pickup apparatus in the single-lens reflex system and the finder view area whose view is limited by the view frame mask is obtained, the image data obtained when the correlation coefficient reaches the largest value is designated as a segmentation position, and the address indicating the segmentation position can be obtained.

When the above mentioned processes are performed, with a view to designating the image data obtained when the correlation coefficient reaches the largest value as a segmentation position, and obtaining the address indicating the segmentation position, a partial image adjacent to a finder view area corresponding to a predetermined rectangular view frame mask is segmented, a correlation coefficient between the adjacent partial image and a partial image extracted from a captured image is obtained by shifting a partial image having the same area as the adjacent partial image in the capture area in the X or Y axis direction in a pixel unit, and an address at which the correlation coefficient between the extracted partial image and the adjacent partial image reaches the largest value can be obtained.

The control system according to another aspect of the present invention performs a control process between the view area of the finder optics provided in the image pickup apparatus and the capture area when the image pickup apparatus captures an image, and includes: an image pickup apparatus in the single-lens reflex system having at least a captured image information transmission unit for transmitting the information about a captured image, and a designation information reception unit for receiving designation information; a view area image pickup apparatus for capturing the view area of the finder optics provided in the image pickup apparatus in the single-lens reflex system; and a control value arithmetic device having an arithmetic unit for computing the scope of the finder view area located in the capture area according to the image information corresponding to the finder view area captured by the image pickup apparatus and the image information captured by the image pickup apparatus in the single-lens reflex system, and an output unit for outputting the information obtained by the arithmetic unit as the designation information to the image pickup apparatus in the single-lens reflex system. The image pickup apparatus in the single-lens reflex system receives and stores the designation information computed by the arithmetic unit, and allows the capture area used when a capturing process is performed to match the finder view area determined according to the designation information. With the above-mentioned configuration, the designation information obtained by the arithmetic unit of the control value arithmetic device is stored in the image pickup apparatus, and the capture area used when a capturing process is performed is allowed to match the view area of the finder optics according to the designation information. Therefore, the finder optics having a high view ratio can be provided only by once performing the control process using the control system on the image pickup apparatus.

Additionally, the image pickup apparatus in the single-lens reflex system according to a further aspect of the present invention having at least a captured image information transmission unit for transmitting the information about a captured image and a designation information reception unit for receiving designation information includes: a view area information storage unit for storing the designation information about the view area of the finder optics provided in the image pickup apparatus in the single-lens reflex system; an arithmetic unit for performing an arithmetic operation for designation of a capture scope of image information to be recorded according to the designation information stored in the view area information storage unit such that the view area can match the capture area represented by the information about the captured image; and a record image generation unit for generating and recording image information for recording an image according to the information about a captured image based on the capture scope of the image information designated in the arithmetic operation by the arithmetic unit.

With the configuration, the designation information about the view area of the finder optics of the image pickup apparatus is stored in the view area information storage unit, the capture scope of the image information for recording is designated according to the designation information such that the view area can match the capture area indicated by the information about the captured image, and the image information is generated and recorded according to the information about the captured image based on the designated capture scope. Therefore, finder optics having a high view area can be provided only by once transmitting to the image pickup apparatus the appropriate information about the view area of the finder optics as the designation information.

In the above mentioned image pickup apparatus in the single-lens reflex system, a view frame mask having a rectangular opening is provided for the finder optics, and the dimension of each of the sides of the opening of the view frame mask is obtained by multiplying the size of the cell of an image pickup device unit in the image pickup apparatus in the single-lens reflex system by a multiple of 8.

With the configuration, although a record image is to be recorded after being compressed in, for example, the JPEG system, the view of the finder optics can match the scope of the record image in a pixel unit after the JPEG process.

BRIEF DESCRIPTION OF THE DRAWINGS

The present invention will be more apparent from the following detailed description when the accompanying drawings are referenced.

DESCRIPTION OF THE PREFERRED EMBODIMENTS

The embodiments of the present invention are described below by referring to the attached drawings.

Figure 1:
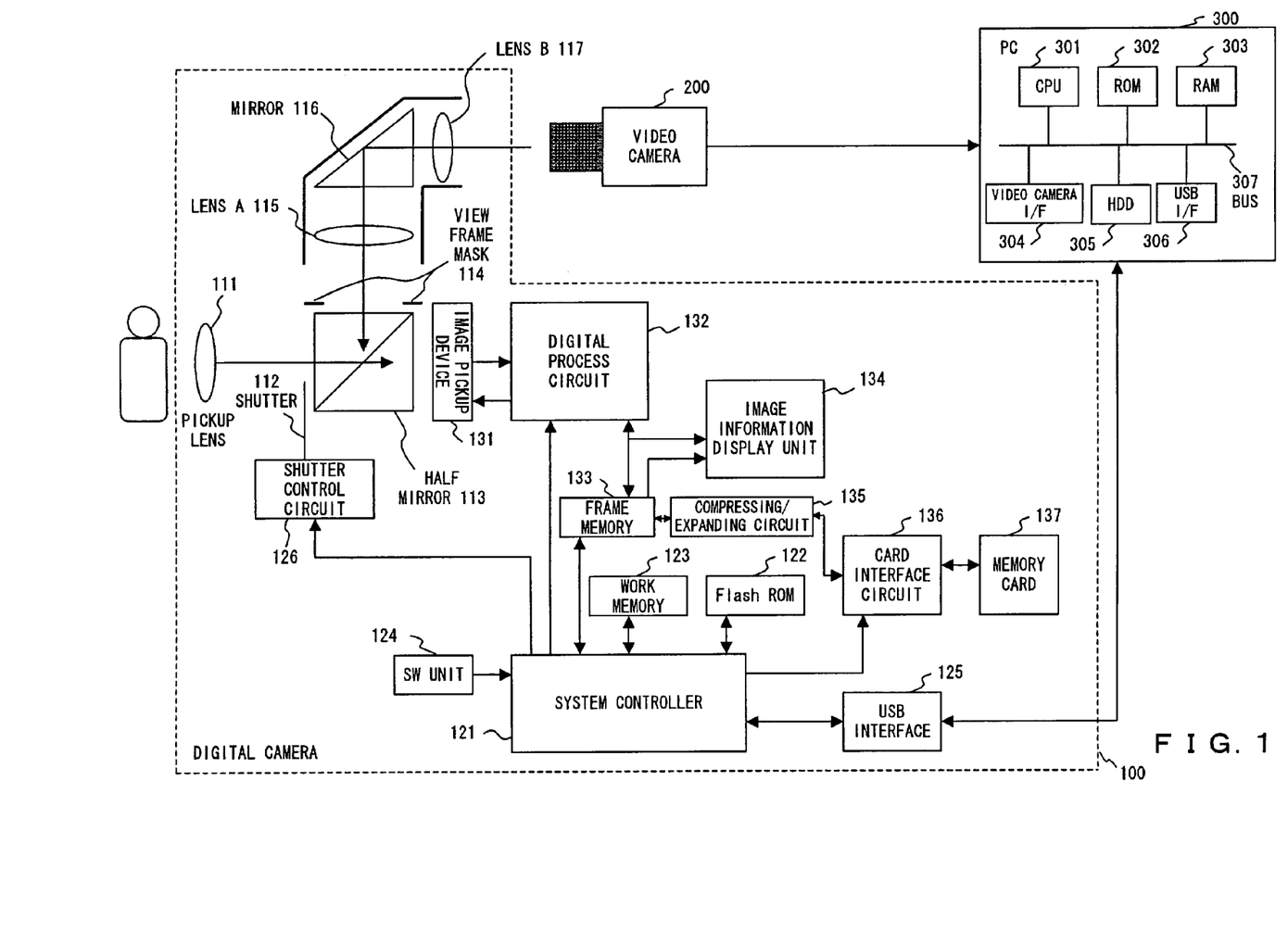
FIG. 1 shows the configuration of the system embodying the present invention.

FIG. 1 shows the configuration of the system embodying the present invention. The system shown in FIG. 1 comprises a digital camera 100, a video camera 200, and a personal computer (PC) 300, and the system is produced in the check and control process in the production process of the digital camera 100.

The digital camera 100 is a single-lens reflex camera which takes a subject, and can observe a subject image obtained through a pickup lens 111 using an optical finder.

Described below is the configuration of the digital camera 100.

The pickup lens 111 forms a subject image on the photoreceiving surface of an image pickup device 131.

A shutter 112 controls the quantity of light passing through the pickup lens 111 by changing the size of the opening.

A half mirror 113 divides the light passing through the shutter 112 into the light traveling toward the finder optics and the light traveling toward the pickup optics.

A view frame mask 114 is a hollow mask for superposing the view frame displaying the scope of the image captured by the digital camera 100 on the image observed by the optical finder.

The light traveling toward the finder optics first passes through the view frame mask 114, then through a lens A 115, changes the direction by a mirror 116, passes through a lens B 117, and, as a result, forms a subject image on the video camera 200.

A system controller 121 comprises a CPU (central processing unit), and manages the control of the entire operations of the digital camera 100.

Flash ROM (Flash EEPROM) 122 records in advance a control program for allowing the CPU of the system controller 121 to control the entire operations of the digital camera 100. The CPU can control the digital camera 100 by reading and executing the control program from the flash ROM 122.

Work memory 123 is required by the CPU of the system controller 121 in executing the control program stored in the flash ROM 122.

A switch (SW) unit 124 refers to a switch group operated by a user of the digital camera 100 in issuing various instructions to the digital camera 100.

An USB interface 125 provides an interface in accordance with the USB (universal serial bus), which is one of the data transmission standards in the serial system, for communicating data with other equipment, and controls the communications of data to and from the PC 300 with the configuration shown in FIG. 1.

A shutter control circuit 126 controls the size of the opening of the shutter 112 at an instruction from the system controller 121.

The image pickup device 131 performs an optoelectronic transform on the subject image formed on the photoreceiving surface, and outputs an analog signal indicating an image representing the subject image.

A digital process circuit 132 removes reset noise contained in the analog signal output from the image pickup device 131 and controls the signal level, and converts the analog signal obtained after the above-mentioned processes into image data which is digital data. Furthermore, it also performs an image correcting process such as a y correction, a white balance, etc. on the image represented by image data, and a process of converting the image data represented by the brightness of the three optical primary colors of RGB into the representation by YC (luminance—color difference) elements.

Frame memory 133 is used as buffer memory for temporarily storing image data output from the digital process circuit 132, and also used as a work storage area for the processes by a compressing/expanding circuit 135.

An image information display unit 134 comprises an LCD (liquid crystal display), and displays regenerated captured image, various information, etc.

The compressing/expanding circuit 135 performs an image data expanding process for recording and regenerating image data and an image data compressing process. According to the present embodiment, the compressing/expanding circuit 135 performs the image data expanding process and the image data compressing process in the JPEG (joint photographic experts group) system.

A card interface circuit 136 writes and reads data to and from a memory card 137.

The memory card 137 is a semiconductor record medium for recording image data, and is configured to be freely removed from the digital camera 100. The digital camera 100 is configured as described above.

The video camera 200 captures a subject image obtained through the finder optics of the digital camera 100, and transmits the captured image to the PC 300.

The PC 300 compares the image captured by the video camera 200 with the image formed on the surface of the image pickup device 131 through the pickup optics of the digital camera 100, and outputs the comparison result to the digital camera 100.

As for the configuration of the PC 300, it comprises: a CPU 301 for controlling each component by executing a control program; ROM 302 for storing in advance a basic control program for allowing the CPU 301 to control each component; RAM 303 used as a work area when the CPU 301 executes the control program; a video camera interface (I/F) 304 for obtaining a captured image transmitted from the video camera 200; a hard disk device (HDD) 305 used as a storage area of the control program described later and various data; and a USB interface (I/F) 306 for providing an interface in accordance with the USB standard for communicating data with other equipment, and controlling the communications of data to and from the digital camera 100 with the configuration shown in FIG. 1. These components are connected through a bus 307 managed by the CPU 301, and configured such that data can be communicated among the components, thereby configuring a standard computer.

Figure 2A:
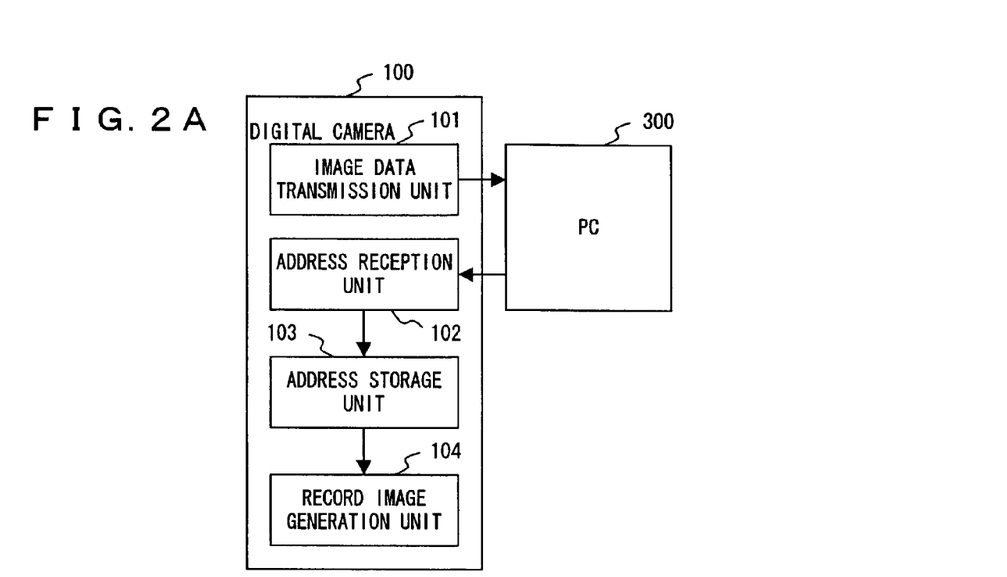
FIG. 2A shows the configuration of the first principle of the present invention.

Described below are the configurations shown in FIGS. 2A and 2B. They show the configurations of the principles according to the present invention. With the configuration of the first principle of the present invention as shown in FIG. 2A, the digital camera 100 comprises an image data transmission unit 101, an address reception unit 102, an address storage unit 103, and a record image generation unit 104. These components are operated by executing the control program stored in advance in the flash ROM 122 in the controlling process performed by the system controller 121.

The image data transmission unit 101 transmits to the PC 300 the image data representing an image captured by the image pickup device 131.

The PC 300 receives the image data, and obtains a correlation coefficient between the image represented by the image data and the subject image captured by the video camera 200 and obtained through the finder optics whose view is limited by the view frame mask 114. Then, the segmentation position of the image data when the correlation coefficient reaches the largest value is designated, and the addresses of the position (leading address and trailing address) are transmitted to the digital camera 100.

The address reception unit 102 receives the address transmitted from the PC 300.

The address storage unit 103 stores the address received by the address reception unit 102.

The record image generation unit 104 segments an image according to the address stored in the address storage unit 103 from the image data representing the image captured by the image pickup device 131, and stores the image data of the segmented image as a captured image. The record image generation unit 104 performs the above-mentioned operations each time a user uses the digital camera 100 to newly capture an image.

Thus, the digital camera 100 segments an image, from the image captured by the image pickup device 131, having the highest correlation with the image of the finder optics whose view is limited by the view frame mask 114, and the segmented image is used as a captured image. Therefore, the image of the finder optics can be close to the captured image without considering the outline of the parts package of the CCD, the precision error possibly occurring in the fixed position, etc., thereby guaranteeing an ideal view ratio in the finder optics.

With the above-mentioned configuration shown in FIG. 2A, the leading address and the trailing address are transmitted from the PC 300 as the address indicating the segmentation position of the image data, the address reception unit 102 of the digital camera 100 receives the address, and the address storage unit 103 stores the address. If the image recorded as the captured image is rectangular, and the values of the vertical and horizontal sides are known, then the known values of the image are stored in a record image size storage unit 105 as in the second configuration of the principle of the present invention shown in FIG. 2B, one of the leading address and the trailing address is transmitted from the PC 300 as the address indicating the segmentation position of the image data, and the address reception unit 102 of the digital camera 100 receives the address and the address storage unit 103 stores it, thereby allowing the record image generation unit 104 to segment the image from the image data representing the image captured by the image pickup device 131, and reducing the amount of information transmitted from the PC 300 to the digital camera 100.

Figure 3A:
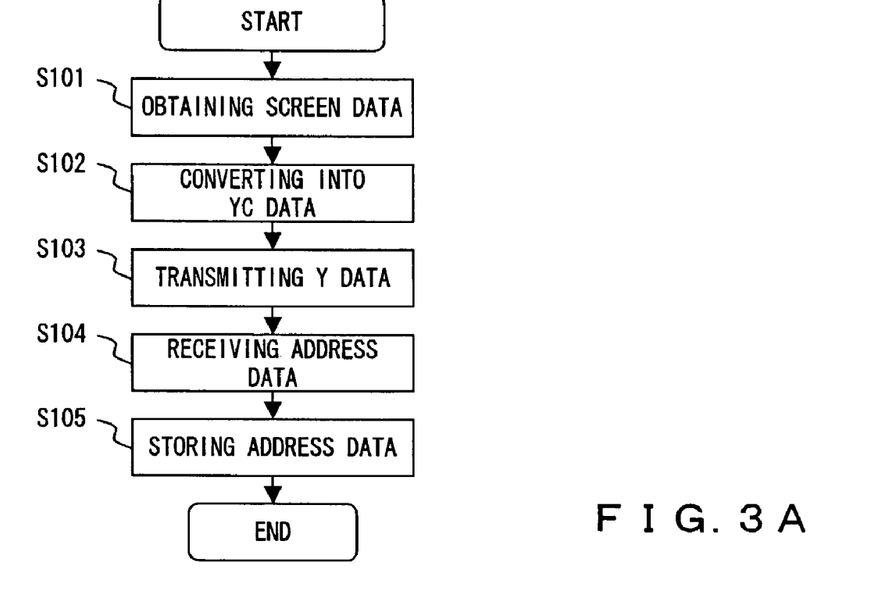
FIG. 3A is a flowchart of the contents of the address setting process performed by the system controller of a digital camera.
Figure 3B:
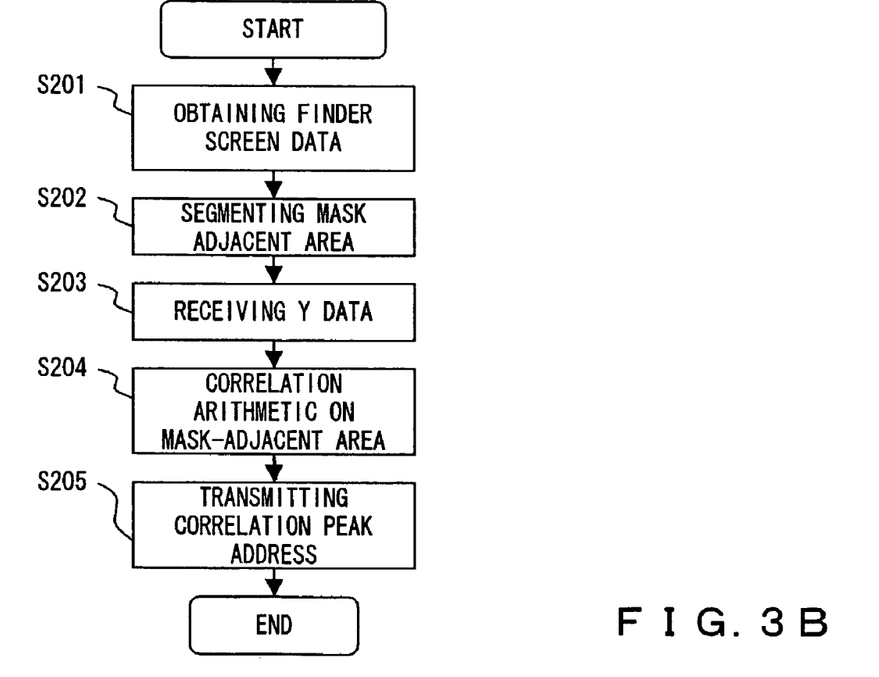
FIG. 3B is a flowchart of the contents of the address setting process performed by the CPU of a PC.

Described below are the processes shown in FIGS. 3A and 3B. FIGS. 3A and 3B are flowcharts of the contents of the address setting process. The address setting process is performed to obtain an address indicating the segmentation position of the above mentioned image data.

In FIGS. 3A and 3B, FIG. 3A shows the process performed by the system controller 121 of the digital camera 100, and FIG. 3B shows the process performed by the CPU 301 of the PC 300.

Described first below is the process in FIG. 3A. This process is performed by the system controller 121 by reading and executing the control program stored in the flash ROM 122, and starts when an instruction to start the address setting process is input from the SW unit 124, etc.

First, in S101, the image data representing the image captured by the image pickup device 131 is obtained by the digital process circuit 132, and is temporarily stored in the frame memory 133.

In S102, the representation format of the image data stored in the frame memory 133 is converted by the digital process circuit 132 from the format based on the brightness of the optical primary colors of RGB into the format based on the YC elements. The image data represented by the YC elements is temporarily stored in the frame memory 133.

Figure 4:
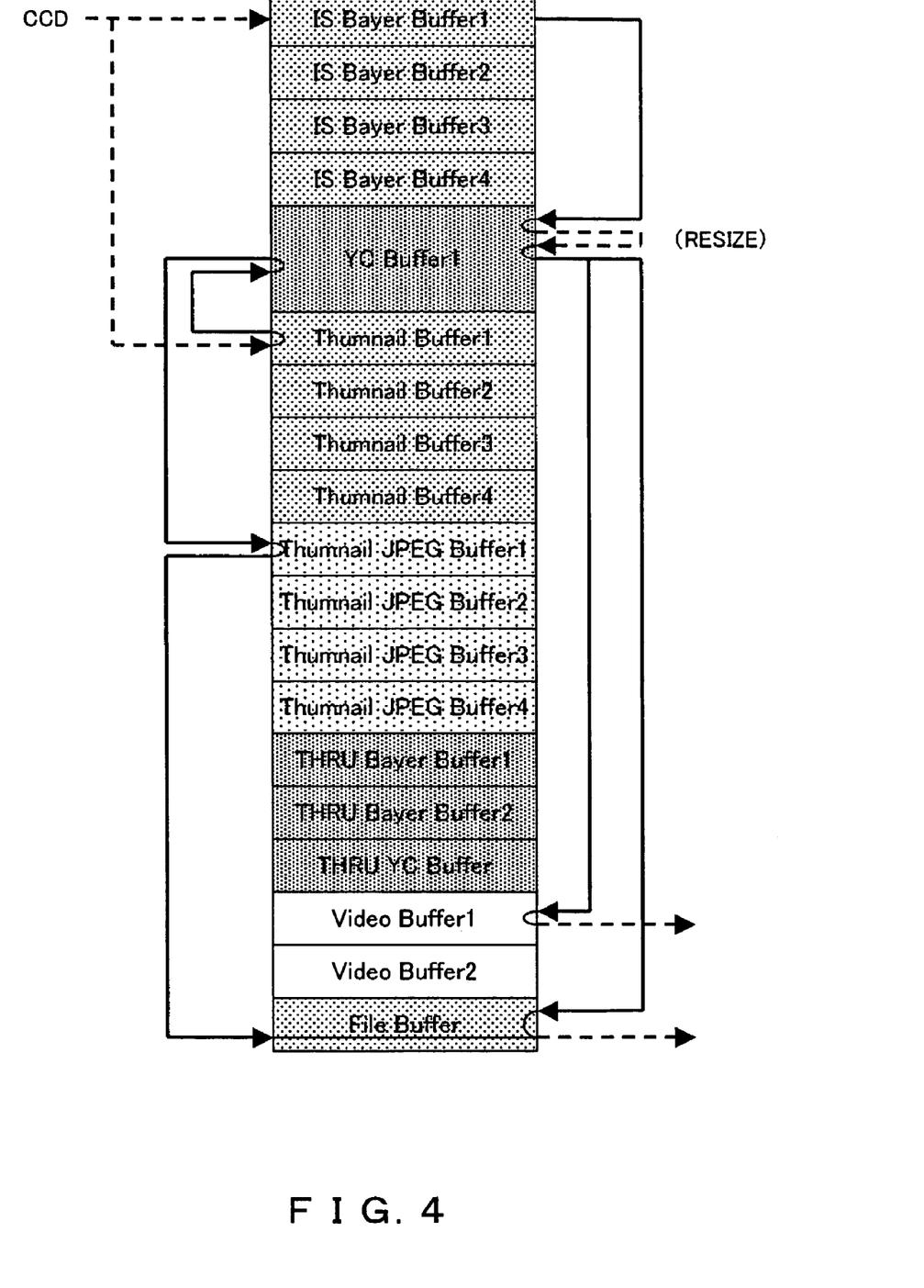
FIG. 4 shows the state of using frame memory.

FIG. 4 shows the state of using the frame memory 133.

The image data obtained from the digital process circuit 132 in the process in S101 is first stored as RGB Bayer data in the 'IS Bayer Buffer' area in the frame memory 133. Then, in the process in S102, the image data is converted into the representation of YC elements, and the converted data is stored in the 'YC Buffer' area. The image data represented by the YC elements ($YC_bC_r$) is then treated in the image data compressing process in the JPEG system by the compressing/expanding circuit 135, and is also used in generating a video signal for display of an image on the image information display unit 134.

In S103, the data containing only the Y (luminance) elements in the image data represented by the YC elements stored in the frame memory 133 in the process in the previous step is retrieved, and the process of transmitting the Y element data to the PC 300 is performed by the USB interface 125.

In S104, the process of receiving the address transmitted from the PC 300 for designation of the segmentation position of an image is performed by the USB interface 125.

In S105, the process of storing the address received by the USB interface 125 is performed by the flash ROM 122.

After performing the process, the process shown in FIG. 3A is completed, and an address for designation of the segmentation position of the image is completely set on the digital camera 100, and the digital camera 100 is shipped to the distribution market.

Described below is the process shown in FIG. 3B. This process is performed by the CPU 301 reading and executing the control program stored in the HDD 305, and starts if an instruction to start the address setting process is issued to the PC 300.

First, in S201, the I/F 304 performs the process of obtaining the image data (finder image data) representing the subject image obtained through the finder optics of the digital camera 100 transmitted from the video camera 200.

In S202, from among the images (finder images) represented by the finder image data obtained in the process in the previous step, the partial image in the portion adjacent to the view frame formed by the view frame mask 114 is segmented.

Figure 5A:
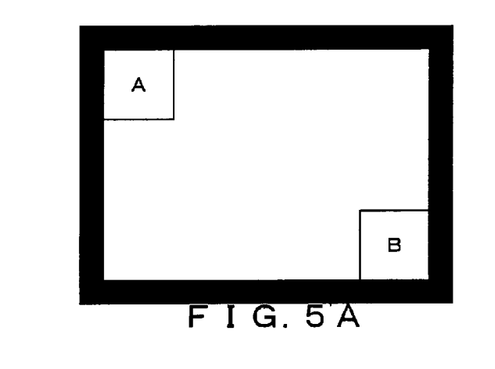
FIGS. 5A through 5D show the processes performed by a PC.

The process in S202 is explained by referring to FIG. 5A as follows. That is, in the process in S202, the partial image which is adjacent to the view frame in the finder images, and marked with 'A' in the upper left position in FIG. 5A, and the partial image marked with 'B' in the lower right position are segmented. These images are referred to as 'images in the mask-adjacent area'.

Figure 5B:
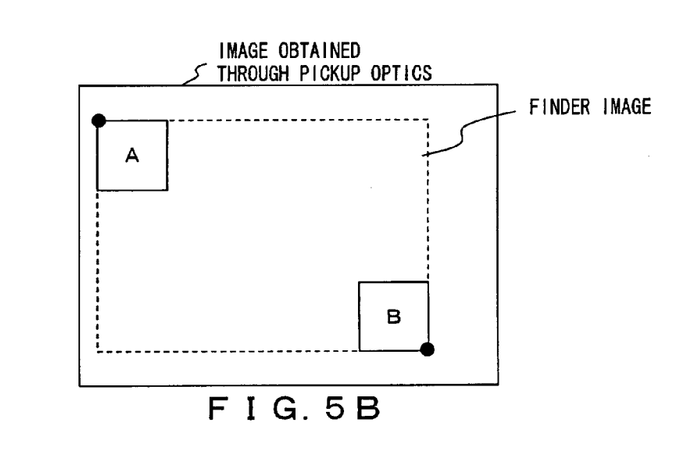

In S203, the USB I/F 306 performs the process of obtaining the image data containing only the Y elements transmitted from the digital camera 100 in the above-mentioned process in S103. The image represented by the image data is obtained through the pickup optics, and has a wider scope by the effect of the view frame mask 114 as compared with the finder image as shown in FIG. 5B.

In S204, the correlation arithmetic is performed on the image in the mask-adjacent area.

The correlation arithmetic in the process in S204 is performed on the captured image separately in two directions, that is, in the horizontal direction and the vertical direction.

Figure 5C:
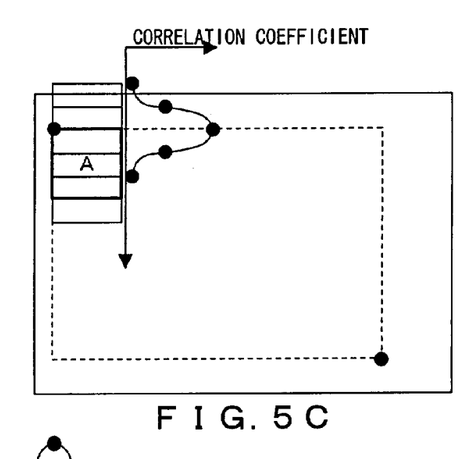

First, as shown in FIG. 5C, a partial image having an area equal to the mask-adjacent area A is extracted from the captured image while shifting the image pixel by pixel in the vertical direction, and the correlation coefficient between the extracted partial image and the image in the mask-adjacent area A is computed. When the correlation coefficient reaches the largest value, that is, the correlation between the extracted partial image and the image in the mask-adjacent area A reaches the largest value, the position in the vertical direction of the top pixel of the extracted partial image is obtained.

Figure 5D:
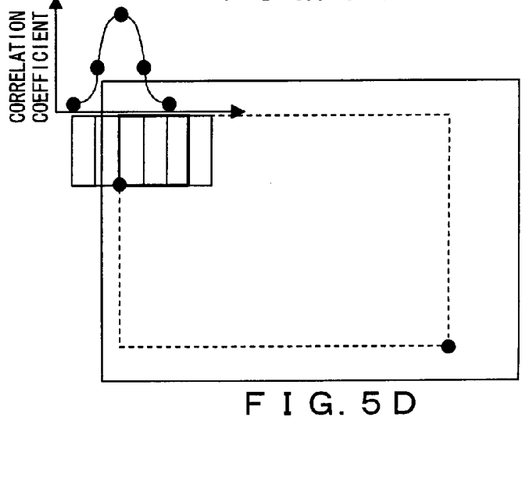

Then, as shown in FIG. 5D, a partial image having an area equal to the mask-adjacent area A is extracted from the captured image while shifting the image pixel by pixel in the horizontal direction, and the correlation coefficient between the extracted partial image and the image in the mask-adjacent area A is computed. When the correlation coefficient reaches the largest value, that is, the correlation between the extracted partial image and the image in the mask-adjacent area A reaches the largest value, the position in the horizontal direction of the leftmost pixel of the extracted partial image is obtained.

Then, according to the address information about the 'YC Buffer' area of the frame memory 133 prepared in the PC 300, the address at which the data of the pixel located at the intersection of the position in the vertical direction and the position in the horizontal direction is stored is obtained as described above. The obtained address is the leading address designating the segmentation position of the image data.

Next, the position of the partial image having the largest correlation coefficient to the mask-adjacent area B is similarly obtained from the captured image, and the address at which the data of the pixel at the lower right corner of the obtained partial image is stored in the 'YC Buffer' area of the frame memory 133 is obtained. Thus, the obtained address is the trailing address designating the segmentation position of the image data.

It is desirable that the subject image has a somewhat complicated pattern because the largest value of a correlation coefficient can be clearly detected.

In S205 shown in FIG. 3B, the USB I/F 306 performs the process of transmitting the leading address and the trailing address obtained as described above to the digital camera 100. The data indicating the addresses is stored in the flash ROM 122 in the processes in S104 and Sl05 shown in FIG. 3A.

After these processes, the process in FIG. 3B terminates, the process of setting the address for designation of the segmentation position of the image on the digital camera 100 is completed, and the digital camera 100 is shipped to the distribution market.

Afterwards, when the digital camera 100 captures an image, the system controller 121 allows the compressing/expanding circuit 135 to read only the data representing the image contained in the rectangle having as its vertexes the positions of the two pixels of the image designated by the leading address and the trailing address in the image data stored in the 'YC Buffer' area of the frame memory 133, and the image data generated by the above mentioned data is stored in the memory card 137. Thus, an ideal view ratio is guaranteed for the finder optics of the digital camera 100.

Figure 2B:
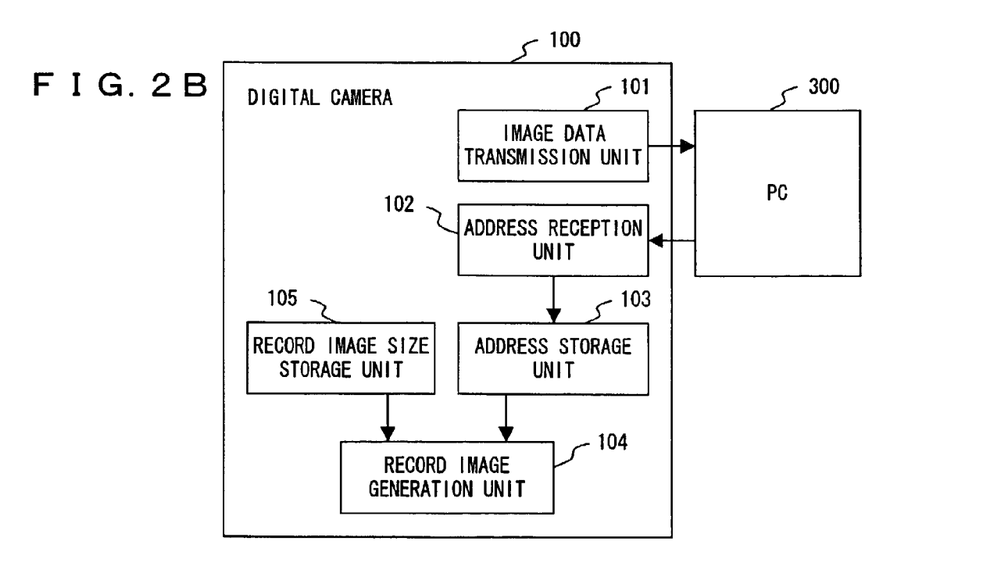
FIG. 2B shows the configuration of the second principle of the present invention.

If the shape and the size of the record image are set in advance, and the settings are stored in the flash ROM 122, etc. as shown in FIG. 2B, then a correlation arithmetic is performed on only one of the mask-adjacent areas A and B, one of the leading address and the trailing address is transmitted from the PC 300 as the address indicating the segmentation position of the image data, and the digital camera 100 receives the address and allows the flash ROM 122 to store it, thereby segmenting the image of the image data representing the image captured by the image pickup device 131. To attain this, the compressing/expanding circuit 135 reads only the data representing the image contained in the rectangle which has a pixel designated by the leading address or the trailing address as a vertex and whose shape is designated by the image size in the image data stored in the 'YC Buffer' area of the frame memory 133.

Figure 6:
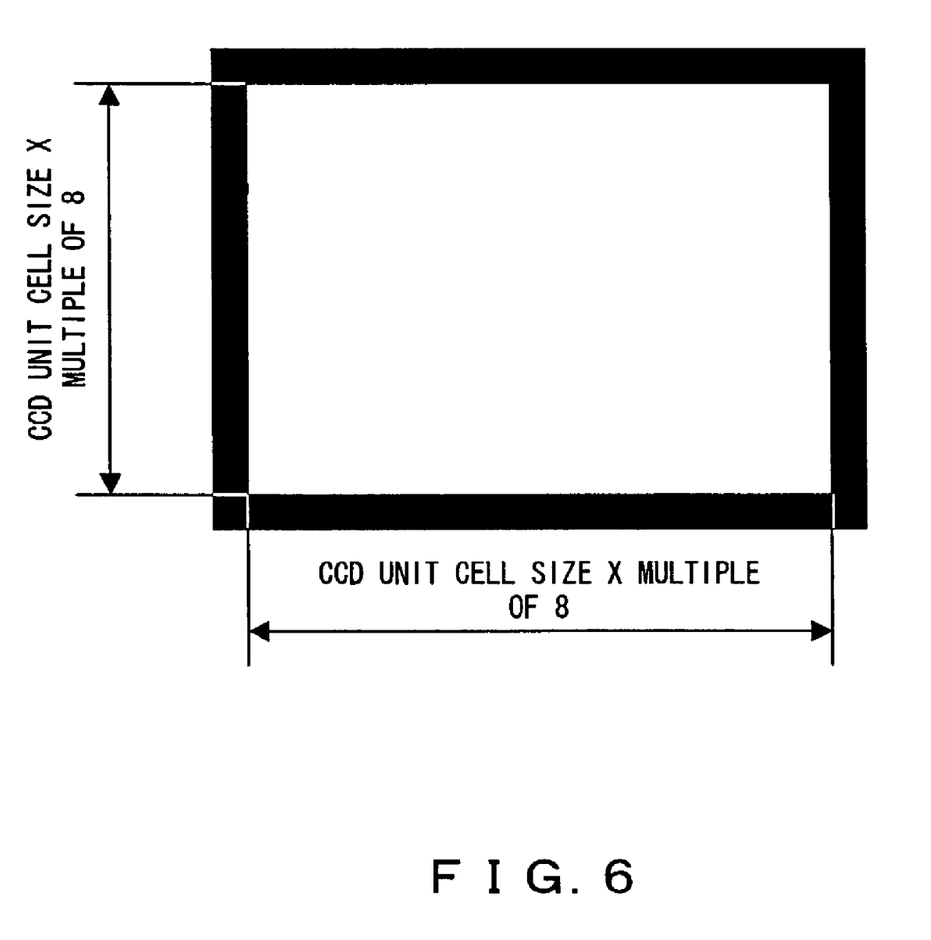
FIG. 6 shows the process performed by a PC.

Furthermore, the vertical and horizontal lengths of the opening of the view frame mask 114 are usefully obtained by multiplying the cell size of the CCD unit used as the image pickup device 131 by a multiple of 8 as shown in FIG. 6. In this method, since data is compressed in an 8×8 block unit in the JPEG system, the scope of the view frame can match in pixel unit the scope of the record image after the JPEG expanding process, thereby also guaranteeing the view ratio of 100%.

The present invention can also be embodied by generating a control program for performing the process shown by the flowchart in FIG. 3B by a computer having a standard configuration, and directing the computer to execute the program. Furthermore, the present invention can also be embodied by storing the program in a computer-readable storage medium, and directing the computer to read the program from the storage medium for execution by the CPU.

Figure 7:
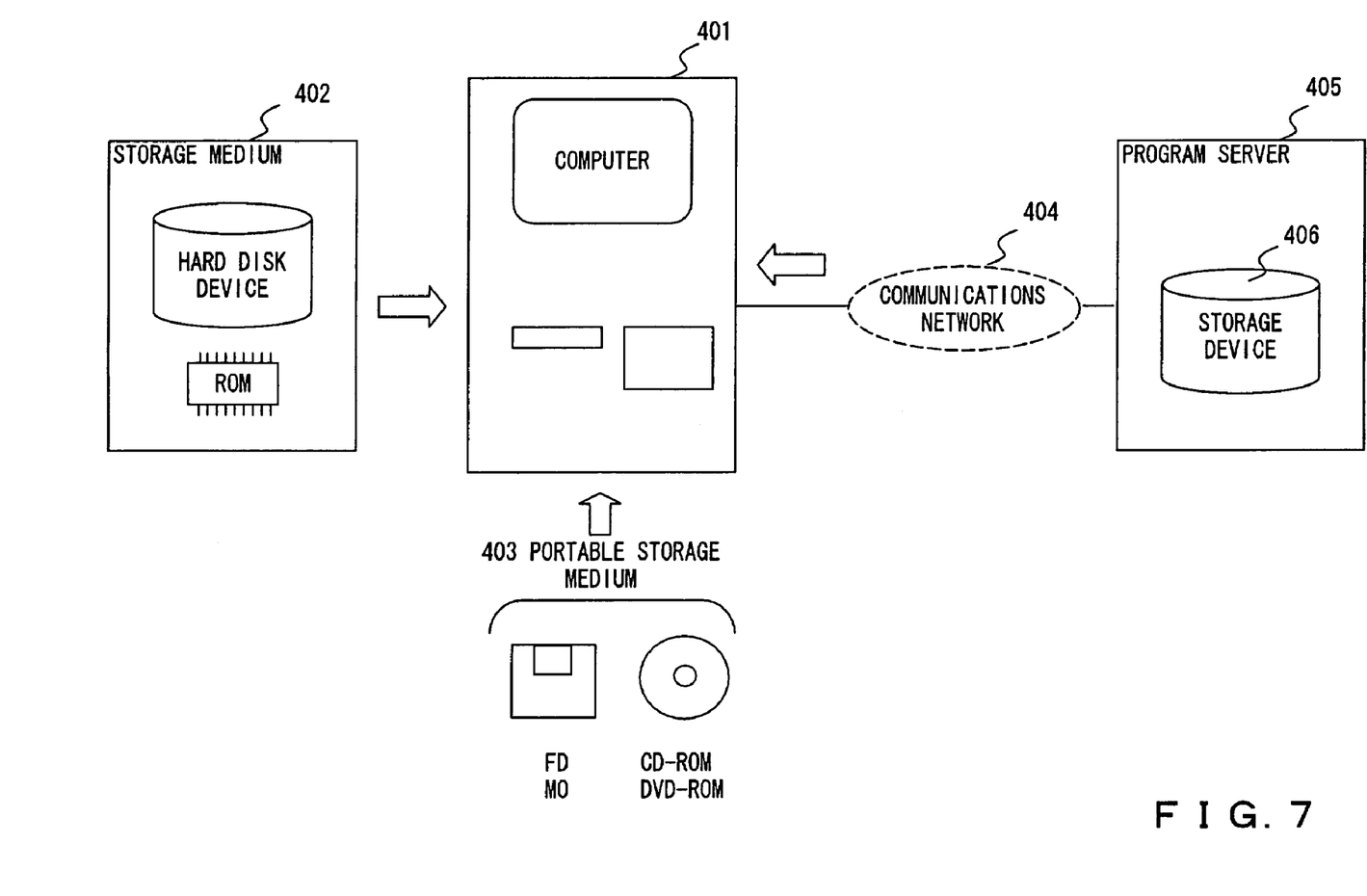
FIG. 7 shows an example of a computer-readable storage medium storing a recorded control program.

FIG. 7 shows an example of a computer-readable storage medium. The storage medium can be, for example, a storage medium 402 which can be built in a computer 401 or provided as an external accessory device such as ROM, a hard disk device, etc., a portable storage medium 403 such as an FD (flexible disk), an MO (magneto-optic disk), CD-ROM, DVD-ROM, etc.

A storage medium can also be a storage device 406 built in or externally provided for a program server 405 connected to the computer 401 through a communications network 404. In this case, a transmission signal obtained by modulating a carrier signal by the control program stored in the storage device 406 of the program server 405 can be transmitted from the program server 405, and the computer 401 can demodulate the control program according to the transmission signal received through the communications network 404 for execution by the CPU.

Figure 8:
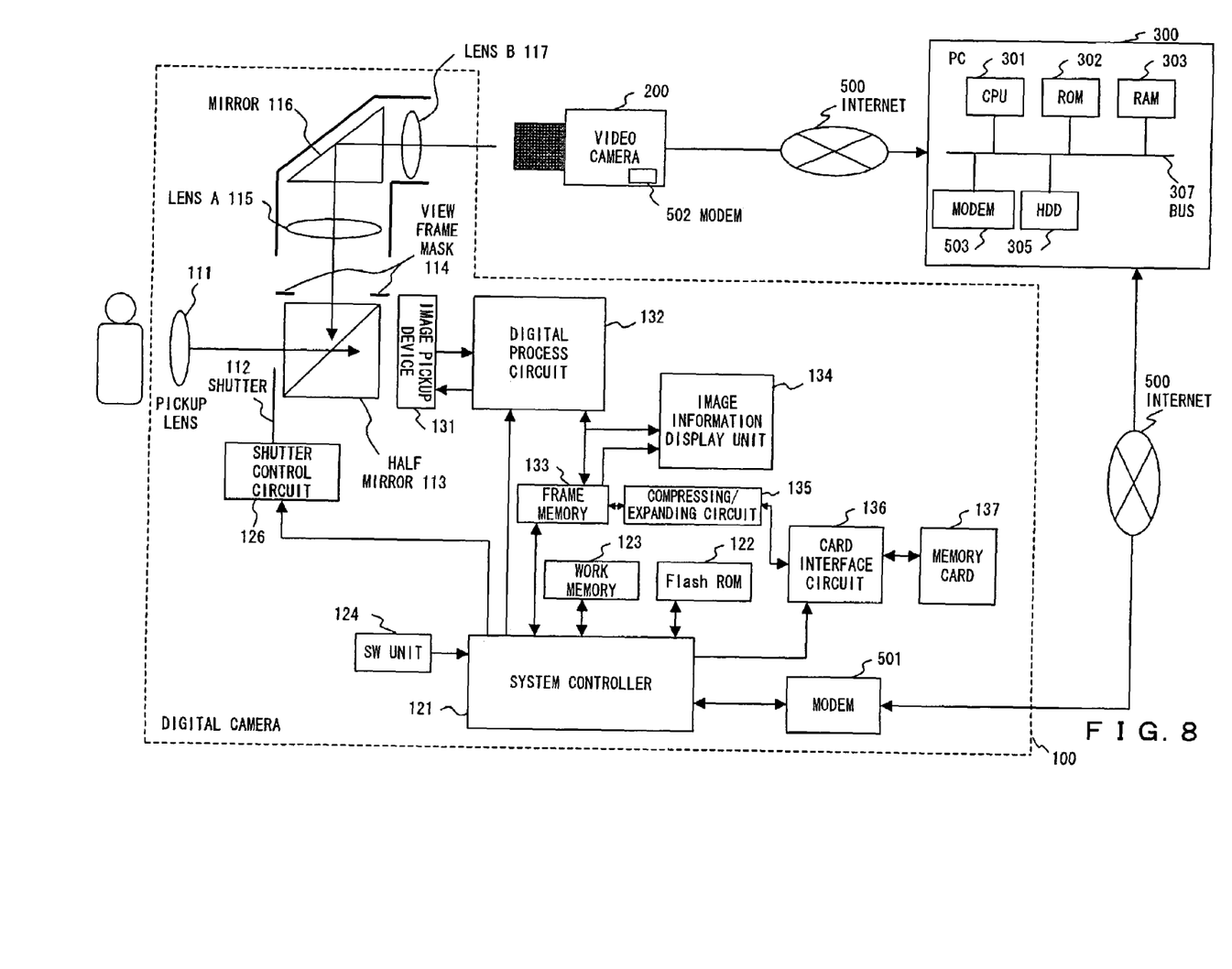
FIG. 8 shows an example of a variation of the system configuration embodying the present invention.

Additionally, the present invention is not limited to the above-mentioned embodiments, but can be realized as various improved and amended variations. For example, in the system shown in FIG. 1, the digital camera 100, the video camera 200, and the PC 300 are directly interconnected through a cable for communications of data such as a captured image, various information, etc. Instead, as shown in FIG. 8, data can be communicated with these pieces of equipment through a communications network such as Internet 500, etc. To attain this, as shown in FIG. 8, modems 501, 502, and 503 can be provided for connection to Internet 500 to each of the digital camera 100, the video camera 200, and the PC 300. Furthermore, the present invention can also be configured by connecting the modems not built in each of the digital camera 100, the video camera 200, and the PC 300, but externally connected to Internet 500 through a USB interface or a video interface.

As described above in detail, the present invention includes the processes of, with a view to controlling the view area of the finder optics provided in the image pickup apparatus in the single-lens reflex system to be consistent with the record area in which data is captured by the image pickup apparatus in the single-lens reflex system: designating an area displayed by the finder optics as a finder view area; designating the area captured by the image pickup apparatus as a capture area; extracting from the capture area an area which is located relative to the finder view area; designating the position information about the extracted area; and recording the position information about the extracted area in a storage unit of the image pickup apparatus in the single-lens reflex system.

Thus, the image pickup apparatus can be allowed to segment the area indicated by the position information stored in the storage unit from the capture area, and record the image in the segmented area when the image is captured, thereby allowing the area indicated by the recorded image to successfully match the view area of the finder optics provided in the image pickup apparatus. Furthermore, since the position information is stored in the storage unit of the image pickup apparatus, the control method according to the present invention has to be used only once before capturing an image, and it is not necessary to repeat using it each time an image is captured.

What is claimed is:

1. A method provided in a single-lens reflex camera having a pickup optics and a finder optics sharing a part of the pickup optics, for controlling a record area for an image passed through the pickup optics to be consistent with a view area observed by the finder optics, comprising:
designating an area displayed by the finder optics as a finder view area;
designating an area captured by the single-lens reflex camera as a capture area;
extracting from the capture area an area which is located relative to the finder view area and matching the extracted area to the content displayed in the finder view area;
designating position information about the extracted area; and
recording the position information about the extracted area in a storage unit of the single-lens reflex camera.

2. The method according to claim 1, wherein said operation of designating the position information of the extracted area comprises:
obtaining a correlation coefficient of a subject image between the capture area captured by the single-lens reflex camera and the finder view area whose view is limited by a view frame mask; and
designating image data obtained when the correlation coefficient reaches a largest value as a segmentation position and obtaining an address indicating the segmentation position.

3. The method according to claim 2, wherein said address is information indicating a vertex of a rectangle corresponding to a predetermined rectangular view frame mask.

4. The method according to claim 3, wherein said information indicating the vertex of the rectangle is at least one of a leading address and a trailing address.

5. The method according to claim 2, wherein said operation of designating image data obtained when the correlation coefficient reaches the largest value as a segmentation position and obtaining an address indicating the segmentation position comprises;
an adjacent partial image segmenting operation of segmenting a partial image adjacent to a finder view area corresponding to a predetermined rectangular view frame mask;
computing a correlation coefficient between the adjacent partial image and a partial image extracted from a captured image by shifting a partial image having the same area as the adjacent partial image in the capture area in an x or y axis direction in a pixel unit; and
obtaining an address at which the correlation coefficient between the extracted partial image and the adjacent partial image reaches the largest value.

6. A system for controlling a view area of finder optics provided in an image pickup apparatus and a capture area when the image pickup apparatus captures an image, comprising:
an image pickup apparatus in a single-lens reflex system at least having a captured image information transmission unit for transmitting information about a captured image, and a designation information reception unit for receiving designation information;
a view area image pickup apparatus, different from the single-lens reflex system, capturing a view area of the finder optics provided in the image pickup apparatus; and
a control value arithmetic device, different from both of the single-lens reflex system and the view area image pickup apparatus, comprising an aritbmetic unit for computing a scope of the finder view area located in the capture area according to the image information corresponding to the finder view area captured by the image pickup apparatus and the image information captured by the image pickup apparatus in the single-lens reflex system, and an output unit for outputting the information computed by the arithmetic unit as the designation information to the image pickup apparatus in the single-lens reflex system, wherein said image pickup apparatus in the single-lens reflex system receives and stores the designation information computed by the arithmetic unit, and conforms the capture area used when a capturing process is performed to the finder view area determined according to the designation information.

7. The system according to claim 6, wherein a view frame mask having a rectangular opening is provided for the finder optics of the image pickup apparatus in the single-lens reflex system, and a dimension of each side of the opening of the view frame mask is obtained by multiplying a size of a cell of an image pickup device unit in the image pickup apparatus in the single-lens reflex system by a multiple of 8.

8. The system according to claim 6, wherein at least one of said image pickup apparatus in the single-lens reflex system and said view area image pickup apparatus is connected to said control value arithmetic device through a communications network.

9. The system according to claim 6, wherein said control value arithmetic device comprises:
an adjacent partial image segmentation unit segmenting a partial image adjacent to a finder view area corresponding to a predetermined rectangular view frame mask;
correlation coefficient computation unit computing a correlation coefficient between the adjacent partial image and a partial image extracted from a captured image by shifting a partial image having the same area as the adjacent partial image in the capture area in an X or Y axis direction in a pixel unit;
an address obtaining unit obtaining an address at which the correlation coefficient between the extracted partial image and the adjacent partial image reaches a largest value; and
an address transmission unit transmitting the address to said image pickup apparatus in the single-lens reflex system.

10. An image pickup apparatus in a single-lens reflex system having a pickup optics and a finder optics sharing a part of the pickup optics, comprising:
a view area information storage unit for storing the designation information about a view area of the finder optics;
an arithmetic unit for performing an arithmetic operation for designation of a capture scope of image information captured by using the pickup optics according to the designation information stored in said view area information storage unit such that the capture scope matches a view area observable by the finder optics; and
a record image generation unit for generating and recording image information for recording an image according to the information about a captured image based on the capture scope of the image information designated in the arithmetic operation by the arithmetic unit.

11. The apparatus according to claim 10, wherein:
a view frame mask having a rectangular opening is provided f or the finder optics, and a dimension of each side of the opening of the view frame mask is obtained by multiplying a size of a cell of an image pickup device unit in the image pickup apparatus in the single-lens reflex system by a multiple of 8.

12. A computer-readable storage medium storing a program used in a single-lens reflex camera having a pickup optics and a finder optics sharing a part of the pickup optics to direct a computer disposed in the single-lens reflex camera to perform a process of controlling a record area, in which data is captured by the single-lens reflex camera, to be consistent with a view area of the finder optics said program comprising:

designating an area displayed by the finder optics as a rectangular-shaped finder view area;

designating an area captured by the single-lens reflex camera as a capture area;

extracting from the capture area an area which is located relative to the finder view area and matching the extracted area to the content displayed in the finder view area;

designating position information about the extracted area; and recording the position information about the extracted area in a storage unit of the single-lens reflex camera.

13. The storage medium according to claim 12, wherein said process of designating the position information of the extracted area comprises:

obtaining a correlation coefficient of a subject image between the capture area captured by the single-lens reflex camera and the finder view area whose view is limited by a view frame mask; and designating image data obtained when the correlation coefficient reaches a largest value as a segmentation position and obtaining an address indicating the segmentation position.

14. The storage medium according to claim 13, wherein said process of designating image data obtained when the correlation coefficient reaches the largest value is designated as a segmentation position and obtaining an address indicating the segmentation position comprises:

segmenting a partial image adjacent to a finder view area corresponding to a predetermined rectangular view frame mask;

computing a correlation coefficient between the adjacent partial image and a partial image extracted from a captured image by shifting a partial image having the same area as the adjacent partial image in the capture area in an X or Y axis direction in a pixel unit; and obtaining an address at which the correlation coefficient between the extracted partial image and the adjacent partial image reaches the largest value.

15. A single-lens reflex camera having a pickup optics and a finder optics sharing a part of the pickup optics comprising:

a view area limit unit limiting a view area of finder optics;

an address information storage unit storing address information generated based on a view area limited by said view area limit unit; and a record image generation unit segmenting designated image information from captured image information according to the address information, so that a content recorded in a capture area and a content displayed in the limited view area match with each other, according to the address information stored in the address information storage unit and generating a record image according to the segmented image information.

16. A system for controlling a view area of finder optics provided in an image pickup apparatus and a capture area when the image pickup apparatus captures an image, comprising:

an image pickup apparatus in a single-lens reflex system at least having a captured image information transmission unit for transmitting information about a captured image, and a designation information reception unit for receiving designation information;

a view area image pickup apparatus capturing a view area of the finder optics provided in the image pickup apparatus in the single-lens reflex system; and a control value arithmetic device comprising an arithmetic unit for computing a scope of the finder view area located in the capture area according to information obtained through Internet, wherein, the image information corresponding to the finder view area captured by the image pickup apparatus and the image information captured by the image pickup apparatus in the single-lens reflex system, and an output unit for outputting the information computed by the arithmetic unit as the designation information to the image pickup apparatus in the single-lens reflex system, wherein said image pickup apparatus in the single-lens reflex system receives and stores the designation information computed by the arithmetic unit, and allows the capture area used when a capturing process is performed to match the finder view area determined according to the designation information.

* * * * *